United States Patent [19]
Dahll

[11] Patent Number: 5,607,168
[45] Date of Patent: Mar. 4, 1997

[54] SEAL INCORPORATING A RESILIENT SEALING ELEMENT

[75] Inventor: Hans H. Dahll, Williams Bay, Wis.

[73] Assignee: Albert Trostel Packings, Ltd., Lake Geneva, Wis.

[21] Appl. No.: 353,200

[22] Filed: Dec. 9, 1994

[51] Int. Cl.$^6$ ..................................................... F16J 15/32
[52] U.S. Cl. ........................... 277/152; 277/136; 277/37; 264/268
[58] Field of Search .................................. 277/152, 153, 277/37, 47, 48, 49, 51, 136; 264/266, 268

[56] References Cited

U.S. PATENT DOCUMENTS

| | | | |
|---|---|---|---|
| 3,549,445 | 12/1970 | McMahon | 156/222 |
| 3,929,341 | 12/1975 | Clark | 277/134 |
| 3,938,813 | 2/1976 | Forch | 277/152 |
| 4,053,166 | 10/1977 | Domkowski | 277/152 |
| 4,114,906 | 9/1978 | Jelinek | 277/166 |
| 4,119,324 | 10/1978 | Denton et al. | 277/134 |
| 4,126,320 | 11/1978 | Pendleton | 277/152 |
| 4,131,285 | 12/1978 | Denton et al. | 277/1 |
| 4,243,235 | 1/1981 | Repella | 277/152 |
| 4,283,064 | 8/1981 | Staab et al. | 277/81 R |
| 4,501,431 | 2/1985 | Peisker et al. | 277/134 |
| 4,526,383 | 7/1985 | Fuchs et al. | 277/152 |
| 4,583,749 | 4/1986 | Hatch | 277/152 |
| 4,613,143 | 9/1986 | Butler | 277/134 |
| 4,623,153 | 11/1986 | Nagasawa | 277/153 |
| 4,643,436 | 2/1987 | Jackowski | 277/1 |
| 4,664,392 | 5/1987 | Hatch | 277/152 |
| 4,667,968 | 5/1987 | Nash et al. | 277/134 |
| 4,699,526 | 10/1987 | Sato | 384/486 |
| 4,721,314 | 1/1988 | Kanayama et al. | 277/152 |
| 4,723,350 | 2/1988 | Kobayashi et al. | 29/417 |
| 4,818,620 | 4/1989 | Pilkington | 428/422 |
| 4,822,058 | 4/1989 | Butler et al. | 277/152 |
| 4,858,516 | 8/1989 | Klein | 92/240 |
| 4,861,045 | 8/1989 | Riley | 277/25 |
| 4,865,335 | 9/1989 | McGann | 277/166 |
| 4,890,849 | 1/1990 | Eason | 277/136 |
| 4,911,454 | 3/1990 | Rapp et al. | 277/152 |
| 4,969,653 | 11/1990 | Breen | 277/153 |
| 4,995,621 | 2/1991 | Devouassoux et al. | 277/37 |
| 5,052,696 | 10/1991 | Hatch | 277/37 |
| 5,056,799 | 10/1991 | Takenaka et al. | 277/47 |
| 5,083,802 | 1/1992 | Shimasaki et al. | 277/152 |
| 5,149,106 | 9/1992 | Takenaka et al. | 277/37 |
| 5,183,271 | 2/1993 | Wada et al. | 277/152 |

FOREIGN PATENT DOCUMENTS

| | | | |
|---|---|---|---|
| 741073 | 2/1933 | France | 277/47 |
| 404125363 | 4/1992 | Japan | 277/152 |
| 94029622 | 12/1994 | Japan | 277/152 |

*Primary Examiner*—Scott Cummings
*Attorney, Agent, or Firm*—Andrus, Sceales, Starke & Sawall

[57] ABSTRACT

A shaft seal includes a case defining an axial portion and a radial portion, and a resilient PTFE sealing member is secured to the case by an elastomeric material, such as rubber, in an injection molding process. The elastomeric material forms an outer ring encasing the case axial portion and the outer portion of the resilient sealing element. The resilient sealing element is initially in the form of a disc-like member having a central aperture, and the shaft seal is formed by clamping the disc-like member and the case together within a pair of mold sections defining mold cavities corresponding to the desired final shape of the elastomeric material. After the elastomeric material has hardened, the seal is placed against a base and a mandrel is used to deflect the inner portion of the resilient sealing member relative to the outer portion. The seal may further include an excluder lip seal formed of the elastomeric material integrally with the ring. The excluder lip seal extends inwardly from the inner edge of the case radial portion, in a direction opposite that of the inner portion of the resilient sealing member.

3 Claims, 2 Drawing Sheets

SEAL INCORPORATING A RESILIENT SEALING ELEMENT

BACKGROUND AND SUMMARY OF THE INVENTION

This invention relates to a shaft seal, and more particularly to a molded shaft seal having a case and a resilient sealing element which are secured together in a molding process.

Various shaft seals are known in the prior art, some of which incorporate a resilient sealing element for engaging the shaft. The resilient sealing element may be formed of a relatively hard material such as PTFE to improve durability. Seals of this type are used in demanding applications such as in the compressor of an automobile air conditioning system.

In some prior art constructions of seals incorporating a PTFE sealing element, adhesives or the like are used to adhere the PTFE sealing element to a case or housing. Some examples are shown in Hatch U.S. Pat. No. 5,052,696 and U.S. Pat. Nos. 5,149,106 and 5,056,799 to Takenaka et al.

It is also known in the prior art to utilize an elastomeric material, such as rubber, to secure the PTFE sealing element to the case or housing, such as is shown in Wada et al U.S. Pat. No. 5,183,271. In the Wada et al '271 patent, the PTFE element is pre-assembled to the case, and this assembly is preformed to an L-shape and is then held in a mold cavity while the elastomeric material is introduced into the mold cavity in a liquid state, resulting in a final assembly in which the PTFE element and the axial portion of the case are encased by the elastomeric material.

It is an object of the present invention to provide an improved molded seal construction in which a PTFE sealing element and the case are secured or held together using an elastomeric material, such as rubber. It is a further object of the invention to simplify the structure of a seal incorporating a PTFE sealing element, and to simplify the manner in which such a seal construction is attained. A still further object of the invention is to provide a seal having a PTFE sealing element in which leak paths through the interior of the seal are eliminated. Yet another object of the invention is to provide an improved arrangement for preventing rotation between the case and the PTFE sealing element.

In accordance with one aspect of the invention, a shaft seal includes a case which defines an axial portion and a radial portion. A resilient sealing member, preferably formed of a material such as PTFE, includes an outer portion positioned inwardly of the case axial portion and against the case radial portion, and an inner portion extending at an angle relative to the outer portion inwardly of the radial portion of the case. The resilient sealing member terminates in an inner edge engageable with the shaft and deflectable upon contact of the sealing member with the shaft. An elastomeric material, such as rubber, surrounds the axial portion of the case and engages at least a portion of the case radial portion and the outer portion of the sealing member, for holding the case and the resilient sealing member together to form a seal construction. The outer portion of the resilient sealing member includes notches in which the elastomeric material is received, so as to prevent rotation between the sealing member and the case. The notches are formed in an outer peripheral edge of the resilient sealing member, located adjacent the case axial portion. The elastomeric material is preferably formed so as to define an auxiliary seal engageable with the shaft, adjacent the inner portion of the resilient sealing member. In addition, the elastomeric material is preferably further formed so as to define an excluder lip seal engageable with the shaft and extending from the inner edge of the case radial portion. The inner portion of the resilient sealing member extends in a first direction relative to the case radial portion, and the excluder lip seal extends from the case radial portion in a second direction opposite the first direction. With this construction, the inner portion of the resilient sealing member is located between the excluder lip seal and the auxiliary seal, both of which are defined by the elastomeric material. The elastomeric material overlies the inner edge of the case radial portion between the excluder lip seal and the inner portion of the resilient sealing member, and defines an outer ring which encases the case axial portion. The elastomeric material further includes connecting structure extending between the outer ring and the excluder lip seal. The connecting structure at least partially overlies the case radial portion, and may be in the form of a series of spaced, radially extending connectors which extend between the excluder lip seal and the outer ring.

In accordance with another aspect of the invention, a method of constructing a shaft seal includes the steps of providing a case and a resilient sealing member, both of which are constructed as summarized above. The resilient sealing member is positioned against the radial portion of the case, such that the inner portion of the resilient sealing member extends inwardly of the case radial portion. The case axial portion and at least part of the sealing member outer portion and the case radial portion are encased with an elastomeric material to hold the case and resilient sealing member together to form a unitary seal construction. Thereafter, the inner portion of the resilient sealing member is deflected relative to the sealing member outer portion, to facilitate engagement of the sealing member with the shaft. The resilient sealing member is initially in the form of a disc-like member having an aperture therethrough. The step of positioning the resilient sealing member against the case radial portion is carried out by clamping the case radial portion and the disc-like resilient sealing member together between a pair of mold sections, at least one of which defines a mold cavity about the case axial portion and the outer portion of the resilient sealing member. The encasing step is carried out while the case and the resilient sealing member are clamped between the pair of mold sections, by introducing the elastomeric material in a liquified state into the mold cavity and thereafter solidifying the elastomeric material to hold the case and the sealing member together to form a unitary seal construction. The step of deflecting the inner portion of the resilient sealing member is carried out by removing the unitary seal construction from the mold sections after the elastomeric material is solidified, and thereafter holding the seal construction while engaging the inner portion of the resilient sealing member with a mandrel having an angled end. The method further includes the step of forming an excluder lip seal with the elastomeric material, inwardly of the inner edge of the case radial portion. The elastomeric material is formed to define an outer ring which encases the case axial portion, and the step of forming the excluder lip seal is carried out by forming the elastomeric material such that the elastomeric material at least partially overlies the case radial portion between the outer ring and the excluder lip seal. The excluder lip seal is formed so as to extend inwardly of the inner edge of the case radial portion, so that the elastomeric material adjacent the excluder lip seal overlies the inner edge of the case radial portion.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
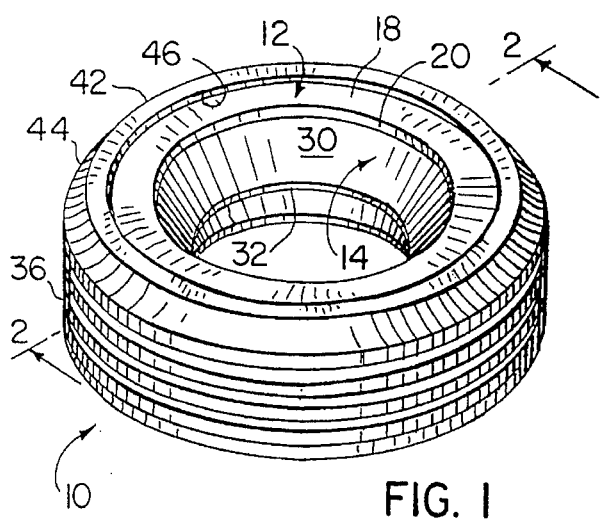
FIG. 1 is an isometric view of a unitary shaft seal constructed according to the invention.
Figure 2:
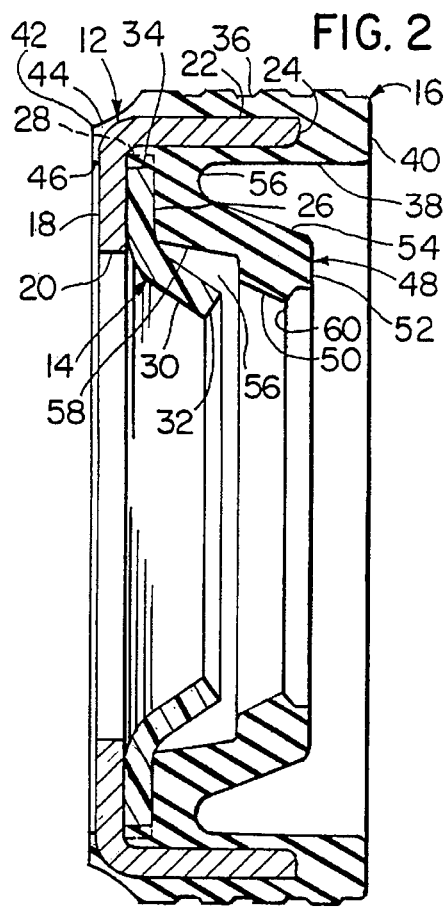
FIG. 2 is a section view taken along line 2—2 of FIG. 1.

Referring to FIGS. 1 and 2, a composite annular shaft seal 10 generally includes a case 12 and a resilient sealing member 14. Case 12 and sealing member 14 are held together by an elastomeric ring 16, formed in a manner as will be explained.

Case 12 is formed of a rigid material, and includes a radial portion 18 terminating in an inner edge 20, and an axial portion 22 terminating in an end 24. Radial portion 18 and axial portion 22 are preferably oriented at 90° to each other, although in some applications radial portion 18 and axial portion 22 are oriented non-perpendicularly to each other. Radial portion 18 extends in a radial direction relative to the centerline of the shaft about which seal 10 is placed, whereas axial portion 22 extends in a direction parallel to the longitudinal axis of the shaft.

Sealing member 14 includes an outer portion 26 terminating in an outer edge 28, and an inner portion 30 terminating in an inner end 32. The forward surface of outer portion 26 engages the rearward surface defined by case radial portion 18, and inner portion 30 extends inwardly from inner edge 20 of case radial portion 18 at an angle relative to outer portion 26 and case radial portion 18.

As noted previously, sealing member 14 is formed of a durable, resilient flexible material such as PTFE, or any other suitable material.

Outer edge 28 of sealing member 14 is provided with a series of notches 34 about its periphery. Outer edge 28 is located inwardly of the inner surface of case axial portion 22, such that notches 34 open onto the inner surface of case radial portion 18 and face toward the inner surface of case axial portion 22. Notches 34 are shaped and formed such that they are approximately equally spaced on the outer periphery of sealing member 14.

Elastomeric ring 16 is formed of a relatively soft, resilient material such as rubber. Ring 16 defines a ribbed outer surface 36, an inner surface 38, a rear end surface 40 and a forward end surface 42. An arcuate corner edge surface 44 extends between front end surface 42 and outer surface 36.

Front end surface 42 terminates in an inwardly facing edge 46. Front end surface 42 extends past the corner defined by case 12 between its radial portion 18 and its axial portion 22, and edge 46 is located such that a majority of the forward surface defined by case radial portion 18 is exposed.

An auxiliary seal, shown generally at 48, extends inwardly from ring inner surface 38, and is formed integrally with ring 16. Auxiliary seal 48 includes a sealing surface 50 engageable with the shaft. Auxiliary seal 48 terminates in an end surface 52, and includes an outer surface 54 interconnected with ring inner surface 38 via an arcuate surface 56.

Auxiliary seal 48 further includes a recess 56 disposed forwardly of sealing surface 50, and defined by a pair of surfaces 58, 60. Recess 56 is adapted to receive inner portion 30 of sealing member 14 when sealing member inner portion 30 is engaged with sealing member inner edge 32 and deflected outwardly.

As shown, the resilient material making up ring 16 and auxiliary seal 48 functions to encase case axial portion 22, as well as sealing member outer portion 26 and the area of case radial portion 18 between the outer edge 28 of sealing member outer portion 26 and the rear surface of case axial portion 22. This, in combination with ring front wall 42, functions to secure case 12 and resilient sealing member 14 together, to form a unitary composite seal construction held together by the elastomeric material of ring 16 and the portion of the material of auxiliary seal 48 overlying resilient sealing member 14.

In use, shaft seal 10 is engaged with a shaft by inserting the shaft through the opening defined by resilient sealing member 14, such that the outer surface of the shaft engages inner portion 30 of resilient sealing member 14 to deflect inner portion 30 outwardly into recess 56. Contact is provided on the shaft by the corner of resilient sealing member 14 between inner portion 30 and inner edge 32. If a larger diameter shaft is used, the inner surface of inner portion 30 engages the outer surface of the shaft. Sealing surface 50 of auxiliary seal 48 engages the shaft outer surface as well, and resilient sealing member 14 and auxiliary seal 48 function to provide a fluid-tight seal about the shaft upon rotation of the shaft. The presence of the material of ring 16 within notches 34 prevents rotation of sealing member 14 relative to ring 16 and case 12 upon rotation of the shaft.

Figure 3:
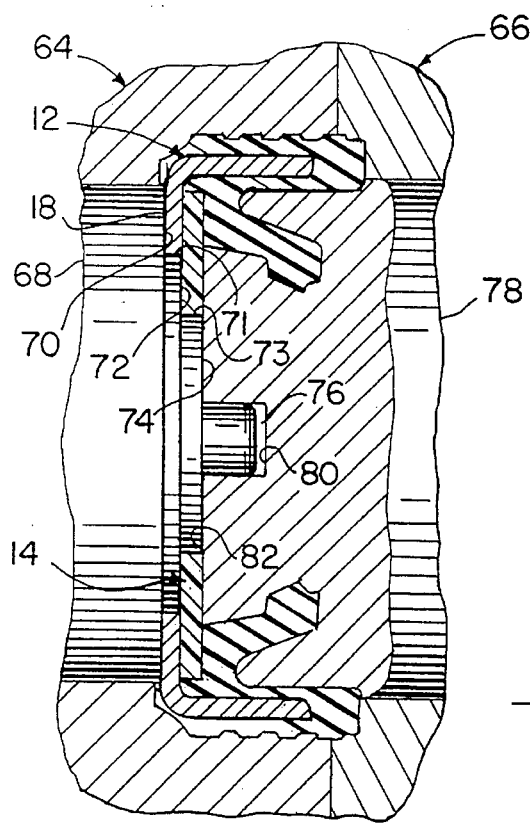
FIG. 3 is a partial section view through a pair of mold sections used to form the shaft seal of FIGS. 1 and 2, showing the resilient sealing member in its undeformed initial condition.
Figure 4:
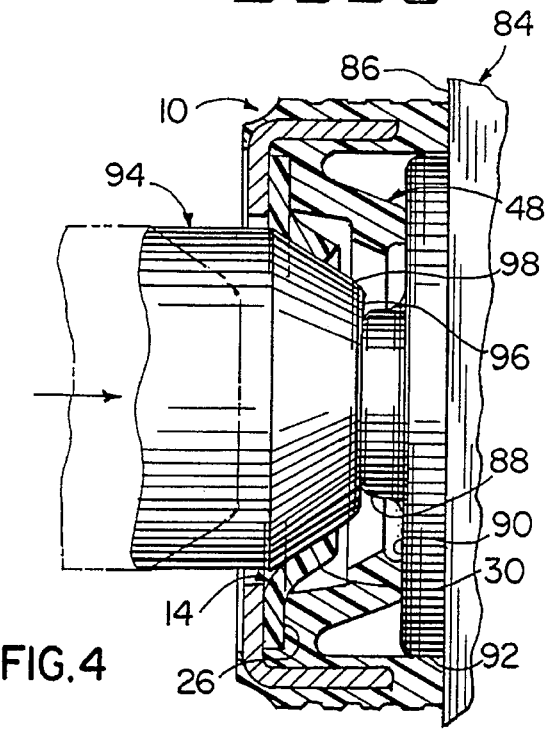
FIG. 4 is a partial section view showing deforming of the inner portion of the resilient sealing member after removal of the seal from the mold sections of FIG. 3.

FIGS. 3 and 4 illustrate the method steps by which shaft seal 10 is constructed. As shown in FIG. 3, a pair of mold sections 64 and 66 are moved together to define an internal cavity having a shape corresponding to the shape of the elastomeric material of shaft seal 10, as illustrated in FIG. 2. Mold section 64 includes a clamping section 68 having a stepped end surface defining an outer surface 70, a shoulder 71, an intermediate surface 72, a shoulder 73, and an inner surface 74 from which a central boss 76 extends. Mold section 66 includes a clamping section 78 which defines a central recess 80 surrounded by a clamping surface 82. In operation, case 12 is positioned such that the forward surface of case radial portion 18 engages outer clamping surface 70 of clamping section 68. Shoulder 71 is received within the opening defined by inner end 20 of case radial portion 18. Next, resilient sealing member 14, which initially is in the form of a disc-like member having a central opening, is placed onto clamping section 68 such that the forward surface of its outer portion 26 engages the rearward surface defined by case radial portion 18. Shoulder 73 is received within the opening defined by inner edge 32 of resilient sealing member 14. Clamping sections 68 and 78 are then moved together, with boss 76 being received within recess 80 to ensure proper alignment between mold sections 64, 66 and between case 12 and resilient sealing member 14. The liquified elastomeric material, such as rubber, is then introduced into the cavity defined by mold sections 64, 66 in a conventional manner, and mold sections 64, 66 are maintained together while the liquified rubber is solidified to form a shaft seal having a unitary construction. Thereafter, mold sections 64, 66 are moved apart and shaft seal 10 is removed.

Next, shaft seal 10 is placed on a stepped base 84 having an abutment surface 86 against which end 40 of ring 16 is placed. Base 84 further includes a central boss 88 surrounded by an intermediate step 90, with a shoulder 92 being defined between intermediate step 90 and abutment surface 96. Shoulder 92 is sized so as to engage ring inner surface 38 to maintain shaft seal 10 in position on base 84. A mandrel 94 having an end 96 and an angled forming surface 98 is then moved toward shaft seal 10. Angled forming surface 98 engages inner portion 30 of resilient sealing member 14, to deflect resilient sealing member 14 in the direction of auxiliary seal 48, away from case radial portion 18. Engagement of mandrel end 96 with boss 88 limits the movement of mandrel 94 to the position as shown in FIG. 4, and mandrel 94 is then withdrawn from shaft seal 10. Resilient sealing member 14 then partially returns to its undeformed condition, but is pre-formed at an angle relative to its outer portion 26 so as to facilitate engagement with a shaft.

Figure 5:
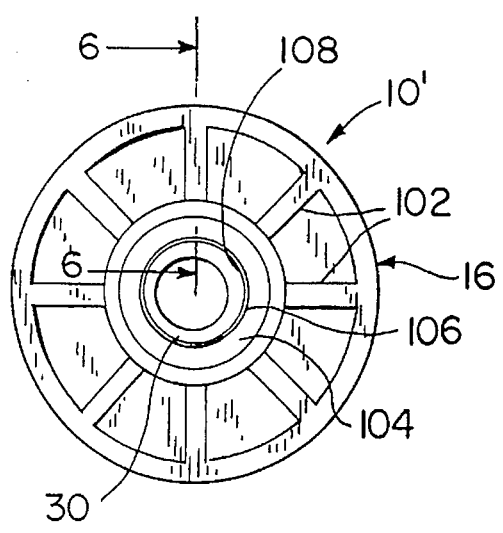
FIG. 5 is an end elevation view of a shaft seal similar to that of FIG. 1 but incorporating an excluder lip seal.
Figure 6:
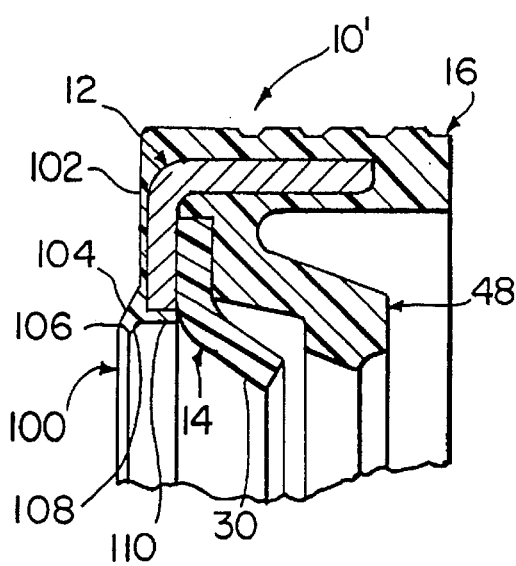
FIG. 6 is a partial section view taken along line 6—6 of FIG. 5.

FIGS. 5 and 6 illustrate a shaft seal 10' having the same basic construction as shaft seal 10 of FIGS. 1 and 2. Shaft seal 10' is generally constructed as illustrated in FIGS. 3 and 4 and as set forth above, and like reference characters will be used where possible to facilitate clarity. Shaft seal 10' differs from shaft seal 10 by the addition of an excluder lip seal, shown generally at 100. Excluder lip seal 100 is formed integrally with ring 16 of the same elastomeric material making up ring 16. The elastomeric material is formed so as to define a series of connectors 102 which extend between ring 16 and excluder lip seal 100. Excluder lip seal 100 includes a forwardly angled surface 104 terminating in an outer end 106. An inwardly extending V-shaped lip 108 is positioned between end 106 and an inner ring 110, which overlies inner edge 20 of case axial portion 18.

Excluder lip seal 100 is formed by modifying the configuration of the end of clamping section 68, in a manner as will be apparent to one of ordinary skill in the art.

In operation, excluder lip seal 100 engages the shaft forwardly of resilient sealing member 14, to prevent debris or the like from coming into contact with resilient sealing member 14 and to maintain an empty space between excluder lip seal 100 and resilient sealing member 14 when seal 10' is engaged with a shaft.

It can thus be appreciated that shaft seals 10, 10' are relatively simple to construct while providing highly satisfactory operation. The use of an adhesive to bond the resilient sealing member to the case prior to molding is eliminated, and initially providing the resilient sealing element in the form of an apertured disc substantially simplifies holding the case and sealing element together during molding while providing very accurate positioning between these elements. Deflecting the inner portion of the resilient sealing member after molding is simple to carry out, yet provides a highly satisfactory and simple method for forcing the portion of the resilient sealing member which engages the shaft.

Various alternatives and embodiments are contemplated as being within the scope of the following claims particularly pointing out and distinctly claiming the subject matter regarded as the invention.

I claim:

1. A seal for a shaft, comprising:

a case defining an axial portion and a radial portion;

a resilient sealing member having an outer portion positioned inwardly of the axial portion of the case and against the radial portion of the case, and an inner portion extending at an angle to the outer portion inwardly of the radial portion of the case, the resilient sealing member inner portion terminating in an inner end engageable with the shaft and being deflectable upon contact with the shaft; and an elastomeric material surrounding the axial portion of the case and engaging at least a part of the radial portion of the case and the outer portion of the sealing member for holding the case and sealing member together and to form a unitary seal construction, wherein the elastomeric material is formed so as to define an excluder lip seal engageable with the shaft and extending from the inner edge of the case radial portion, and wherein the elastomeric material defines an outer ring encasing the case axial portion, and includes connecting structure extending between the outer ring and the excluder lip seal, wherein the connecting structure at least partially overlies the case radial portion, wherein the connecting structure comprises a plurality of spaced, radially extending connectors extending between the excluder lip seal and the outer ring.

2. The seal of claim 1, wherein the inner portion of the resilient sealing member extends in a first direction relative to the case radial portion, and wherein the excluder lip seal extends from the case radial portion in a second direction opposite said first direction.

3. The seal of claim 2, wherein the elastomeric material overlies the inner edge of the case radial portion between the excluder lip seal and the inner portion of the resilient sealing member.

* * * * *